Jan. 10, 1956 G. K. JONES 2,730,165
SEAT LOCKING MECHANISM
Filed July 6, 1953 2 Sheets-Sheet 1
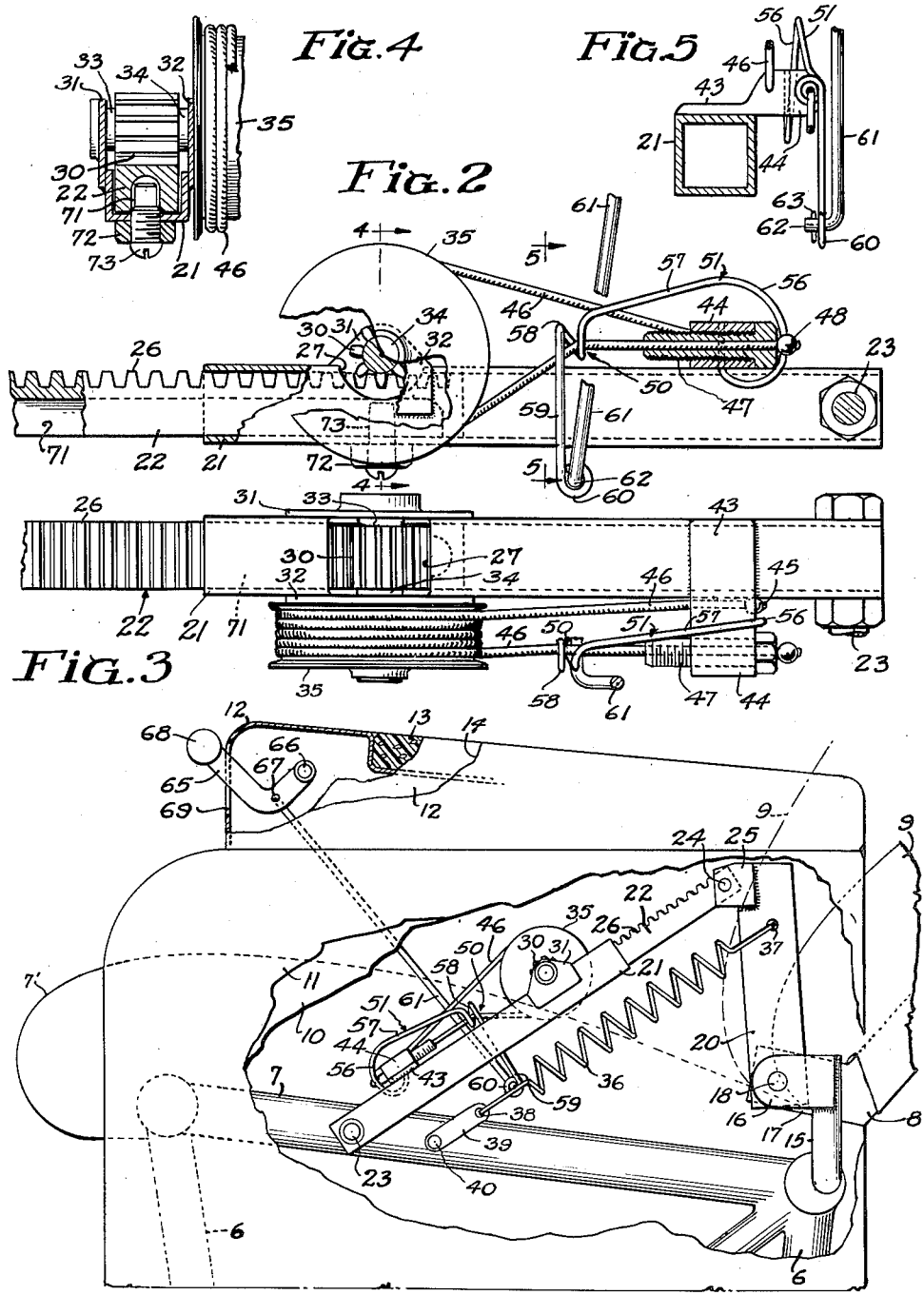

Jan. 10, 1956 G. K. JONES 2,730,165
SEAT LOCKING MECHANISM
Filed July 6, 1953 2 Sheets-Sheet 2
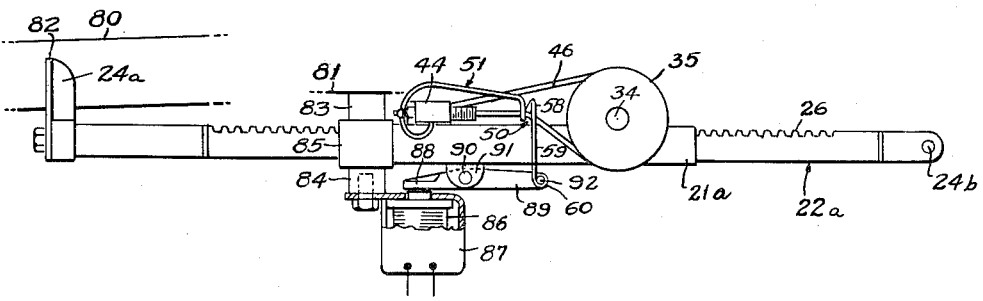
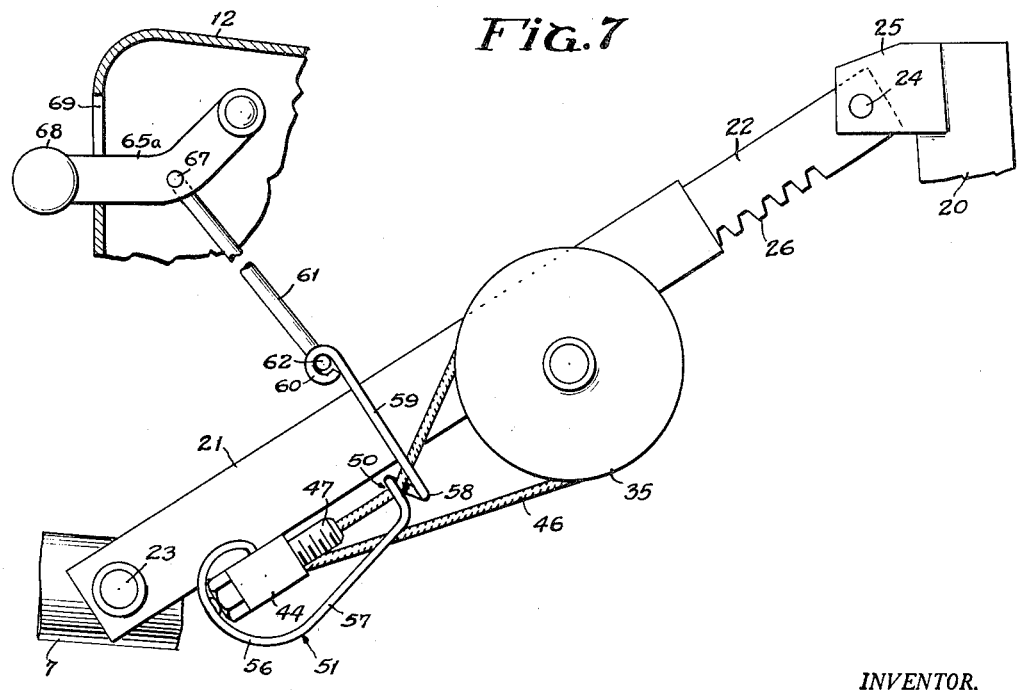
INVENTOR.
GORDON K. JONES
BY
Sellers and Latta
ATTORNEYS

United States Patent Office 2,730,165
Patented Jan. 10, 1956

2,730,165

SEAT LOCKING MECHANISM

Gordon Karl Jones, Burbank, Calif.

Application July 6, 1953, Serial No. 366,290

10 Claims. (Cl. 155—163)

This invention relates to reclining seats of the type used in passenger airplanes, railway coaches, busses, etc. The principal object of the invention is to provide an improved locking mechanism of the general type disclosed in my co-pending application, Serial No. 305,008, filed August 18, 1952.

A particular object of my invention is to provide a locking mechanism which in some respects may lend itself to more economical manufacturing costs than available locking mechanisms of said general type.

Further objects and advantages of my invention will become apparent upon reading the following specification and upon examination of the drawings in which:

Fig. 1 is a side elevation of a portion of a seat assembly with portions of the seat upholstery and the arm shell being broken to illustrate the invention;

Fig. 2 is a fragmentary view of a portion of the locking mechanism viewed from the side opposite to that from which it is seen in Fig. 1;

Fig. 3 is a fragmentary plan view of the mechanism of Fig. 2;

Fig. 4 is a fragmentary detail sectional view taken generally on line 4—4 of Fig. 2 but with the pinion and drum shown in full lines;

Fig. 5 is a detail sectional view taken on the line 5—5 of Fig. 2;

Fig. 6 is a side view of a modified form of the invention; and

Fig. 7 is a side view of another modified form of the invention.

Referring now to the drawings in detail, I have shown a substantial portion of an aircraft seat assembly including supporting legs 6 supporting a seat frame, indicated generally at 7, on which a seat cushion 7' is carried.

The sides of the seat may comprise sheet metal shells 10 with upholstery covers 11, and arm rests superimposed thereon. Such an arm rest may comprise a sheet metal shell 12, a cushion pad 13 supported in a recess therein, and a fabric cover 14. Shell 10 provides within its interior, space to accommodate the seat back adjusting mechanism of my invention. The covers 11 and 14, shown in Fig. 1, are illustrated as being partially broken away to show the shells 10 and 12 therebeneath, fragmentary portions of these shells being shown projecting beyond the broken edges of the covers.

The back frame 8 may be of welded tubular structure and has a pair of short extensions 17 projecting forwardly. The seat frame 7 has a pair of rigid vertical posts 15 which are provided with ears 16. Back frame 8 is connected to seat frame 7 by pivot pins 18 which permit back frame 8 to swing forwardly and rearwardly. It will be understood that back frame 8 and associated cushion 9 are free to swing about pivot pins 18 within the confines defined between the covered shells 10. A crank lever 20 is rigid with extension 17 and projects upwardly therefrom.

The seat lock mechanism of my invention includes a pair of telescoping links 21 and 22, link 21 being in the form of a tube, preferably rectangular in cross section, and link 22 being telescopically received therein. The link 21 is pivotally connected to seat frame 7 on a pivot pin 23, the pin having rigid connection with the seat frame and projecting laterally therefrom into shell 10. The link 22 is connected by a pivot pin 24 to an ear 25 which is secured, as by welding, to crank lever 20. The link 21 has a portion thereof cut away to provide a recess, indicated at 27 (Figs. 2 and 3) within which a spur gear pinion 30 is accommodated. Link 22 has rack teeth 26 meshing with pinion 30. A pair of ears 31, 32 are secured, as by welding, to the side walls of link 21 in positions embracing the recess 27. Trunnions 33 and 34 on opposite sides of pinion 30 are journalled in the ears 31, 32. The pinion 30 engages the rack teeth 26 for locking links 21, 22 together against relative movement as will be hereinafter described.

A drum 35 is secured to the trunnion 34 and is rotatable therewith. A loading spring 36 has one end received in an opening 37 in crank lever 20 and has its opposite end received in an opening 38 in a link 39 which is pivotally secured to frame 7 on a rivet 40. The spring 36 is under constant tension and urges the seat back 8, 9 toward an upright position.

The mechanism for locking the rack and pinion includes a bracket 43 having an eye 44 formed in its free end, the opposite end of the bracket being fixed to the link 21. A flexible cable 46, such as wire rope, is secured at 45 to the bracket 43, is wound around the drum 35 several times, and is then directed back to bracket 43 through a hollow tension adjusting bolt 47. A bead 48 fixed to the end of the cable holds the cable relative to bolt 47. The bolt is threaded through eye 44 and is hence adjustable relative to bracket 43, whereby to obtain the proper amount of slack in cable 46 at the time the overall locking apparatus is assembled within the shell 10. The cable 46 is wound several times about the drum 35 so that the overall slack within the entire length of cable is such that when lateral pressure against the cable is exerted at the point designated 50 the convolutions of the cable about the drum exert a snubbing action against the cylindrical surface of the drum which is adequate to lock the drum against rotation. The arrangement is such that the locking of the drum against rotation can be accomplished by a small amount of lateral pressure on the cable at point 50. The locking of the drum of course, must be adequate to resist the forces created by people of varying weights who occupy the seat and lean against the seat back. For generating the snubbing action, I utilize a bow spring 51, made of a material such as spring steel wire. Spring 51 has one end anchored in bracket 43 as indicated in Fig. 2 and is looped about the bracket in order to attain adequate resilience. The spring proceeds from the underside of the bracket 43 in a spiral convolution 56 which merges into a straight portion 57 at the end of which is an eye 58. From eye 58 the spring projects downwardly to form a substantially straight lever arm 59 having a free end in the form of an eye 60. A push rod 61 is pivoted to the eye 60 as by means of an end portion of the rod, bent at right angles to the body of the rod to constitute a trunnion 62 which is received in eye 60 and secured by a cotter pin 63. Push rod 61 is actuated by a manually operable lever 65 mounted on a pivot 66 which is carried by shell 10. The push rod 61 is pivotally connected at 67 to lever 65. The lever 65 projects through an elongated slot 69 in the end of arm rest shell 12, and has a knob 68 adapted to be manually grasped by a seat occupant.

The spring 51 is tensioned so as to normally exert a constant lateral pressure on cable 46 at point 50 in the manner best viewed in Fig. 2. Under such condition, the lever 65 is in a raised position as shown in Fig. 1. Downward movement of knob 68 will be transmitted by lever 65 and link 61 to lever arm 59 to flex spring 51 downwardly, thereby relaxing the tension in cable 46 and freeing the drum 35 for rotation in response to either a push or pull exerted by rack bar 22. The occupant of the seat can then adjust the position of the seat back within the limits of the relative telescoping movement of links 21 and 22. When the knob 68 is released the spring 51 automatically resumes the pressure on the cable 46 so as to again lock the drum 35 and its associated pinion 30 against rotation, the seat back thus being fixed in the newly adjusted position.

Rack bar 22 has in its underneath surface an elongated slot 71 which extends throughout a substantial portion of its length. A nut 72 is secured to the underneath wall of link 21. A stop screw 73 is threaded through the nut 72 and projects into slot 71 to limit the relative telescoping movement of the two links 21, 22, the bolt contacting the ends of the slot at the positions of maximum adjustment of the seat back in its forward and rearward movement.

It will be understood that links 21 and 22 teeter to some extent about pivot pin 23 as crank lever 20 swings about pivot pin 18, however, the amount of teetering movement permitted within the limits of relative telescoping movement of the links is comparatively slight and is not enough to effect movement of eye 60 of spring 51 sufficiently so as to interfere with the action of the spring in maintaining the desired amount of lateral pressure on the cable. It is significant to note that the over-all locking mechanism including drum 35, cable 46, bracket 43 and spring 51 are all carried by link 21 and the movement of this link about pin 23 is transmitted correspondingly to all of the parts of the locking mechanism, knob 68 being subjected to a slight change of position but not enough to affect the operation of push rod 61 in its function of releasing the locking mechanism upon manually lowering the knob within the limits of the arm slot.

Operation

Assuming seat back 9 is in the position shown in Fig. 1 and it is desired to lower it to a reclining position, the occupant of the seat grasps knob 68 and pushes it downwardly thereby releasing the pressure on cable 46 at point 50. Slack is thereby provided in the cable, enough to permit drum 35 to rotate. The seat occupant leans back against the seat back lowering same against the tension of spring 36, the rack teeth 26 causing rotation of pinion 30 during the retracting movement of link 22. When the seat back reaches the desired position of adjustment, the occupant releases his grasp on knob 68 and spring 51 again exerts the necessary lateral pressure on cable 46 for locking the drum and associated pinion against rotation, thereby locking the seat back in the newly adjusted position. When it is desired to swing the seat back into upright position, the occupant grasps knob 68, pushes it downwardly, thereby releasing the locking mechanism. Spring 36 then automatically swings the seat back to upright position again.

The modified form of the invention as disclosed in Fig. 6

Although designed primarily as an aircraft seat lock, the device of my invention may be adapted to other uses. For example, as shown in Fig. 6, it could be used as a connection between a swinging door, indicated at 80, and the door frame, indicated at 81, functioning to lock the door ajar, in any selected position of opening, or to lock the door in its closed position.

Fig. 6 also illustrates a modified form of the telescoping linkage wherein the rack bar 22a is longer than in Figs. 1–5, and projects from both ends of tubular link 21a. Such a linkage may be utilized for universal adaptation to various aircraft seat designs, and may, for this purpose, have fittings 82, 24b at respective ends of the rack bar, which may be selectively employed to fit varying installation conditions. Also the tubular link 21a may have plural fittings, such as the bosses 83, 84, projecting from opposite sides thereof, for alternative use in differing installation situations. In the example shown, boss 83 provides a pivotal connection to door frame 81, and fitting 82 provides a pivotal connection at 24a, to door 80. Bosses 83 and 84 are attached to the end of tubular link 21a by means of a collar 85 in which such end of the link is received and secured.

Because of the light pressure required for snubbing the cable 46 around the drum 35, the invention is especially adaptable to remote control operation, as illustrated in Fig. 6. For example, a solenoid 86 may be attached to tubular link 21a by having its casing 87 attached to boss 84, and an armature 88, constituting one arm of a lever 89 (pivoted at 90 to a fitting 91 on tubular link 21a and having its opposite end pivoted at 92 to arm 59) may be associated with solenoid 86 in such a manner that energization of the solenoid will actuate bow spring 51 to apply pressure at point 50, so as to establish the locking action.

In such an arrangement, the spring convolution 56 may be preformed to a shape such that eye 58 tends to assume a normal position in which the cable 46 is relaxed, and the action of the solenoid moves the eye 58 against the cable 46 so as to take up the slack therein, while flexing the bow spring 51 in a direction to open the convolution 56.

The invention as disclosed in Fig. 7

Fig. 7 illustrates the most common position of installation of the device of Figs. 1–5. In Figs. 1–5 the device is inverted with reference to the position of Fig. 7. In Fig. 7, the arm 59 extends upwardly, the link 61 is a pull link, and the lock is released by raising knob 68 (the conventional method of releasing an aircraft seat lock).

I claim:
1. In a reclining seat: a seat frame, a seat back hinged thereto for reclining movement; a pair of telescoping links interposed between and connected respectively to said seat back and frame for telescoping movement in response to hinging movement of the seat back relative to the seat frame; and means for locking said links against telescoping movement so as to fix the seat back in a selected position of adjustment, said locking means comprising rack teeth on one of said telescoping links, a pinion journalled on the other link and meshing with said rack teeth, a drum fixed to said pinion, a cable wound around the drum, the ends of said cable being anchored to said other link, a bow spring having one end anchored to said other link and having an intermediate portion engaging the cable and tensioned to exert lateral pressure thereon whereby to snub the cable around the drum and to thereby lock the telescoping links relative to each other, and manually operable means engaging the other end of said spring for flexing said spring in a direction to release the pressure on the cable sufficiently to permit movement of the telescopic links relative to each other.

2. In a reclining seat: a seat frame; a seat back frame hinged to said seat frame for reclining movement; a pair of telescoping links comprising a tubular link and a rack slidable therein, outer ends of said links being connected respectively to said seat frame and to said back frame for telescoping movement of said links in response to reclining movement of said back frame; and means to lock said links against telescoping movement so as to fix said back frame in a selected position of adjustment, said means comprising a pinion meshing with said rack and journalled on said tubular link, a drum fixed to said pinion, a cable wound around the drum, the ends of said cable being anchored to said tubular link, a bow spring having one end anchored to said tubular link and having an intermediate portion directly engaging the cable and tensioned to exert lateral pressure thereon whereby to snub the cable about said drum and to thereby lock the links relative to each other, and manual means directly operable on the other end of said spring to flex the same way from the cable so as to relax the pressure thereon sufficiently to permit movement of the links relative to each other.

3. A reclining seat as set forth in claim 2 including an adjusting member mounted for adjustment on said tubular link, one end of the cable being connected to the adjusting member whereby to adjust the operative length of the cable.

4. In a reclining seat; a seat frame; a seat back hinged thereto for reclining movement; a pair of telescoping links, connected respectively to said seat back and to said frame for telescoping movement in response to hinging movement of said seat back; and means for locking said links against telescoping movement so as to fix the seat back in a selected position of adjustment, said locking means comprising rack teeth on one of said links, a pinion journalled on the other link and meshing with said rack teeth, a drum fixed to said pinion, a cable encircling said drum, the ends of said cable being anchored to said other link, a bow spring having one end anchored to said other link and including an intermediate eye portion through which the cable is threaded, said eye portion normally exerting lateral pressure thereon, and a lever connected to the other end of the spring for selectively releasing the lateral pressure on the cable.

5. In a reclining seat; a seat frame; a seat back hinged thereto for reclining movement; a pair of telescoping links, connected respectively to said seat back and to said frame for telescoping movement in response to hinging movement of said seat back; and means for locking said links against telescoping movement so as to fix the seat back in a selected position of adjustment, said locking means comprising rack teeth on one of said telescoping links, a pinion journalled on the other link and meshing with said rack teeth, a drum fixed to said pinion, a cable encircling said drum, the ends of said cable being anchored to said other link, a bow spring having at one end a convolute portion anchored to one of said telescopic links, having a lever arm portion including an intermediate portion directly engageable with the cable and normally exerting lateral pressure thereon, and at its other end a free end portion, a lever connected to said free end portion for selectively releasing the lateral pressure on the cable, and resilient means connected to the seat back and the seat frame for constantly urging the seat back toward non-reclining position relative to the seat frame.

6. In a reclining seat: a seat frame; a seat back hinged thereto for reclining movement; a pair of substantially aligned links connected together for longitudinal sliding movement and connected respectively to the seat back and to the seat frame, said links extending and retracting in response to hinging movement of said seat back; and means for locking said links against relative movement so as to fix the seat back in a selected position of adjustment, said locking means comprising a rack on one of said links, a pinion journalled on the other link and meshing with said rack, a drum fixed to the pinion, a cable wound around the drum and having its ends anchored to said other link, a loop type spring having at one end a convolute portion anchored to said other link, having its other end free, having an intermediate portion including an eye through which the cable is threaded, said spring normally exerting lateral pressure on the cable, and a pull rod connected to the free end of the spring for actuating the spring to release the lateral pressure on the cable.

7. In a reclining seat: a seat frame; a seat back hinged thereto for reclining movement; a pair of substantially aligned links connected together for longitudinal sliding movement and connected respectively to the seat back and to the seat frame, said links extending and retracting in response to hinging movement of said seat back; and means for locking said links against relative movement so as to fix the seat back in a selected position of adjustment, said locking means comprising a rack on one of said links, a pinion journalled on the other link and meshing with said rack, a drum fixed to the pinion, a cable wound around the drum and having its ends anchored to said other link, a bow spring having one end anchored to said other link, and including a lever arm having an arcuate intermediate portion extending transversely to the body thereof for exerting constant lateral pressure directly against a portion of the cable between the drum and the point where one end of the cable is fastened to the link, said arcuate portion being in cradling relation to said cable portion, and a pull rod connected to the one end of said spring for actuating same to release the lateral pressure on the cable.

8. A reclining seat as set forth in claim 7 having adjustment means for periodically taking up any undesirable slack in the cable.

9. In a reclining seat: a seat frame; a seat back hinged thereto for reclining movement; a pair of substantially aligned links connected together for longitudinal sliding movement and connected respectively to the seat back and to the seat frame at their outer ends, said links extending and retracting in response to hinging movement of said seat back; and means for locking said links against relative movement so as to fix the seat back in a selected position of adjustment, said locking means comprising a rack on one of said links, the other link being in the form of a tube of rectangular section in which said one link is telescoped, a pinion journalled on said other link and meshing with said rack, a drum fixed to the pinion, a cable wound around the drum and having its ends anchored to said other link, a spring means for exerting constant lateral pressure directly against a portion of the cable between the drum and the point where one end of the cable is fastened to the link, a pull rod connected to the spring means for actuating same to release the lateral pressure on the cable, said one link having an elongated recess in its side opposite the rack and extending longitudinally therein, and having a portion thereof defining an abutment at an end of said recess and a projection anchored to said other link and projecting into said recess for limiting the rectilinear movement of one link relative to the other link.

10. Apparatus as defined in claim 9, wherein said projection comprises a stud secured to and projecting through a wall of said tube and having an inner end portion received in said recess.

References Cited in the file of this patent

UNITED STATES PATENTS

| | | |
|---|---|---|
| 426,601 | Muhl | Apr. 29, 1890 |
| 1,773,597 | Myerson | Aug. 19, 1930 |
| 2,133,471 | Opperman | Oct. 18, 1938 |
| 2,644,505 | Dorton | July 7, 1953 |

FOREIGN PATENTS

| | | |
|---|---|---|
| 5,453 | Great Britain | 1903 |
| 503,802 | Great Britain | Apr. 14, 1939 |